(12) United States Patent
Xiao et al.

(10) Patent No.: US 12,400,406 B2
(45) Date of Patent: Aug. 26, 2025

(54) METHOD AND SYSTEM FOR CREATING AUGMENTED REALITY FILTERS ON MOBILE DEVICES

(71) Applicant: Lemon Inc., Grand Cayman (KY)

(72) Inventors: Linshen Xiao, Los Angeles, CA (US); Siding Chen, Los Angeles, CA (US); Jeffrey Jia-Jun Chen, Los Angeles, CA (US); Zhe Huang, Los Angeles, CA (US); Jingcong Zhang, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 235 days.

(21) Appl. No.: 17/728,662

(22) Filed: Apr. 25, 2022

(65) Prior Publication Data

US 2023/0343038 A1    Oct. 26, 2023

(51) Int. Cl.
 *G06T 19/00* (2011.01)
 *G06F 3/04845* (2022.01)
 *G06T 11/00* (2006.01)

(52) U.S. Cl.
 CPC ........ *G06T 19/006* (2013.01); *G06F 3/04845* (2013.01); *G06T 11/00* (2013.01)

(58) Field of Classification Search
 None
 See application file for complete search history.

(56) References Cited

U.S. PATENT DOCUMENTS

| | | | | |
|---|---|---|---|---|
| 10,049,477 B1* | 8/2018 | Kokemohr | ............ | G06T 11/001 |
| 2015/0356669 A1* | 12/2015 | Roescheisen | ...... | G06Q 30/0643 |
| | | | | 705/5 |
| 2018/0374267 A1* | 12/2018 | Yurkin | ............. | G06K 19/06103 |
| 2019/0235644 A1* | 8/2019 | Chen | ........................ | G06F 3/011 |
| 2021/0065287 A1* | 3/2021 | Sights | ................. | G06F 3/04815 |
| 2021/0125405 A1* | 4/2021 | Tran | ....................... | G06T 19/006 |
| 2021/0166473 A1* | 6/2021 | Smith | ................... | H04W 4/021 |
| 2022/0101404 A1* | 3/2022 | Boscolo | ................. | G06T 19/20 |

(Continued)

OTHER PUBLICATIONS

Randi Zimmerman, "How to Make Your Own Instagram AR Filters", Symphonicblog, Oct. 14, 2020, URL: https://blog.symphonic.com/2020/10/14/how-to-make-instagram-ar-filters/ (Year: 2020).*

(Continued)

*Primary Examiner* — David H Chu
(74) *Attorney, Agent, or Firm* — Astute IP Law Group

(57) ABSTRACT

Example aspects include techniques for creating an augmented reality filter on a mobile device. These techniques may include receiving, in response to a selection of a primary augment reality filter template (ARFT), a primary ARFT package corresponding to the primary ARFT, and receiving, in response to the selection of a secondary ARFT, a secondary ARFT package corresponding to the secondary ARFT. In addition, the techniques may include loading the primary ARFT package and the secondary ARFT package to form a combined ARFT, and modifying, based on user input received via a user interface, the combined ARFT to create a customized augmented reality filter (CARF). Further, the techniques may include generating, for the CARF via the development engine, a configuration file that causes the mobile application to add custom perceptive information to visual data.

20 Claims, 5 Drawing Sheets

(56) References Cited

U.S. PATENT DOCUMENTS

| | | | | |
|---|---|---|---|---|
| 2022/0101417 A1* | 3/2022 | Boscolo | G06Q 30/0643 |
| 2022/0101418 A1* | 3/2022 | Dehtiarov | G06V 40/16 |
| 2022/0101566 A1* | 3/2022 | Boscolo | G06T 11/00 |
| 2022/0122573 A1* | 4/2022 | Steinwedel | G10H 1/368 |
| 2022/0202168 A1* | 6/2022 | Troutman | A45D 44/005 |
| 2023/0070631 A1* | 3/2023 | Berger | G06T 7/11 |
| 2023/0230152 A1* | 7/2023 | Debreczeni | G06Q 30/0643 |
| | | | | 705/27.2 |
| 2023/0245350 A1* | 8/2023 | Webber | G06T 19/006 |
| | | | | 345/633 |

OTHER PUBLICATIONS

Ziv Schneider, "Design AR: How to create a face mask using SparkAR", WIXPlayground, May 13, 2020, URL: https://www.wix.com/playground/post/design-ar-how-to-create-a-face-mask-using-sparkar (Year: 2020).*

Diego Moreno Quinteiro, "Tool to Make Conversion of Your Articles to Instant Articles Easier", Meta, May 30, 2018, URL: https://developers.facebook.com/ia/blog/post/v2/2018/05/30/Tool-to-Make-Conversion-of-Your-Articles-to-Instant-Articles-Easier/ (Year: 2018).*

Janine Konerow (QKnow.Studio), "Spark AR: Upload your own Real-Time Simulation/Video Previews [Beginner Tutorial]", Youtube, Mar. 23, 2021, URL: https://www.youtube.com/watch?v=TI9r4POMCxM (Year: 2021).*

Ziv Schneider, "Design AR: How to create a face mask using SparkAR", May 13, 2020, URL: https://www.wix.com/playground/post/design-ar-how-to-create-a-face-mask-using-sparkar (Year: 2020).*

* cited by examiner

METHOD AND SYSTEM FOR CREATING AUGMENTED REALITY FILTERS ON MOBILE DEVICES

BACKGROUND

Augmented reality (AR) techniques may be utilized to generate a view of a real-world environment that is augmented using computer-generated outputs, such as sound or graphics. Typically, users employ pre-configured AR filters each providing a specific augmentation to a user's experience. For example, a user may apply an AR filter for augmenting the user's background in a video of the user and/or adding a three-dimensional visual object to a body part of the user in a video of the user. As users seek more immersive AR experiences, many users will endeavor to create their own custom AR filters that heighten and enrich his or her user experience. However, AR filter design has a steep learning curve that requires use of multiple designs tools and knowledge of complex concepts and techniques. Moreover, the design tools for AR filter design are not available on mobile devices, which are commonly used to apply the AR filters. For example, many mobile devices lack the computing resources needed to execute tools for creating AR filters and/or user interfaces for providing an intuitive and/or user-friendly design experience.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a method may include receiving, by a mobile application, from a remote server in response to a selection of a primary augment reality filter template (ARFT), a primary ARFT package corresponding to the primary ARFT, the primary ARFT package including at least one of one or more first filter scripts for presenting first perceptive information, one or more first filter assets present within the first perceptive information, or one or more first ARFT properties of the first perceptive information. The method further includes receiving, by the mobile application, from the remote server in response to the selection of a secondary ARFT, a secondary ARFT package corresponding to the secondary ARFT, the secondary ARFT package including at least one of one or more second filter scripts for presenting second perceptive information, one or more second filter assets present within the second perceptive information, or one or more second ARFT properties of the second perceptive information. Further, the method includes loading, into a development engine of the mobile application, the primary ARFT package and the secondary ARFT package to form a combined ARFT. In addition, the method may further include modifying, via the development engine, based on user input received via a user interface of the mobile application, the combined ARFT to create a customized augmented reality filter (CARF). Additionally, the method further includes generating, for the CARF via the development engine, a configuration file that causes the mobile application to add custom perceptive information to visual data, the configuration file including one or more filter scripts for presenting the custom perceptive information, one or more filter assets present within the custom perceptive information, and one or more ARFT properties of the custom perceptive information.

In another aspect, an example computer-readable medium (e.g., non-transitory computer-readable medium) storing instructions for performing the methods described herein, an example system or device configured to perform operations of the methods described herein, and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for creating AR filters on mobile devices. Aspects of the present disclosure generate custom AR filters via a design engine available on a mobile device. In particular, aspects of the present disclosure request augmented reality filter template (ARFT) packages from a remote server, modify the ARFT packages via the design engine executing on a mobile device, and generate custom augmented reality filters from the modified ARFT packages using the mobile device. As a result, the present disclosure may be used to perform a traditionally resource intensive operation (i.e., implementing an AR filter feature system that can organize and combine different AR filter features) on a mobile device having limited resources via an easy-to-use interface.

Illustrative Environment

Figure 1:
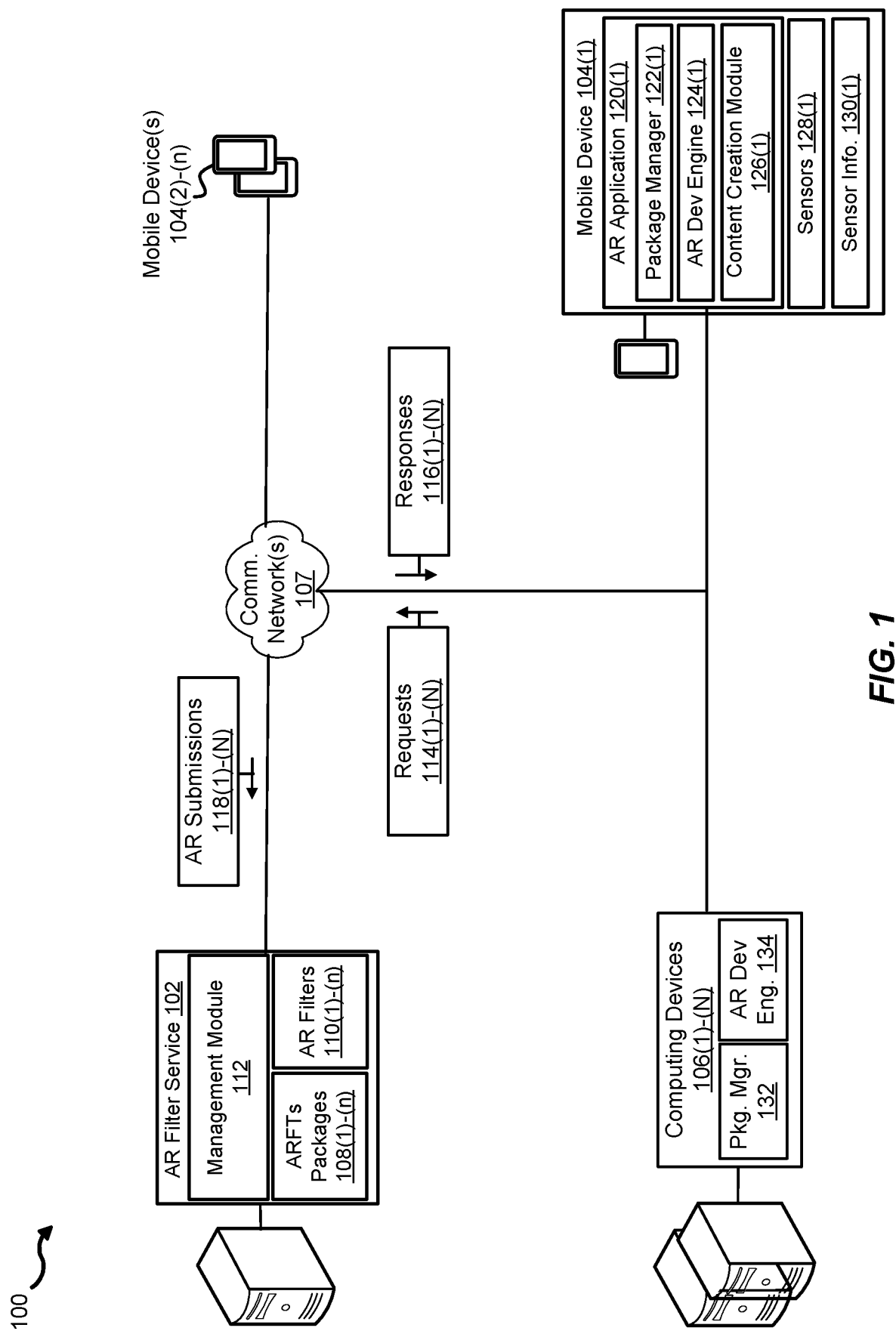
FIG. 1 illustrates an example architecture of an AR filter generation system, in accordance with some aspects of the present disclosure.

FIG. 1 illustrates an example architecture of an AR filter generation system 100, in accordance with some aspects of the present disclosure. The AR filter generation system 100 may be configured to facilitate creation of custom AR filters on mobile devices. In some aspects, "augmented reality" may refer to an interactive experience of a real-world environment where the person(s) and/or object(s) that reside in the real world are enhanced by computer-generated perceptual information across one or more sensory modalities (e.g., visual, auditory, haptic, somatosensory and olfactory). Further, in some aspects, an AR filter 110 may be a computer-generated effect applied across one or more sensory modalities to person(s) and/or object(s) in a real-world environment. An example of an AR filter 110 may include a computer-generated effect layered over an image captured by a camera of a mobile device, e.g., a virtual face paint may be added to the face of a person captured in a plurality of image frames.

As illustrated in FIG. 1, the AR filter generation system 100 may include an AR filter service 102 (e.g., a cloud computing service), a plurality of mobile devices 104(1)-(n), and a plurality of computing devices 106(1)-(n). Some examples of a mobile device 104 include cellular phones, smartphones, tablets, and wearable devices. Some examples of a computing device 106 include desktops, workstations, smartphone devices, virtual machines, etc. Further, the AR filter generation system 100 may include one or more communication networks 107(1)-(n). In some implementations, the communication network(s) 107 may include a radio network, a cellular network, and one or more of a wired and/or wireless private network, personal area network, local area network, wide area network, and/or the Internet. Further, in some aspects, the AR filter service 102, the plurality of mobile devices 104(1)-(n), and the computing devices 106(1)-(n) may be configured to communicate via the communication network(s) 107(1)-(n).

The AR filter service 102 may be configured to provide ARFT packages 108(1)-(n) and AR filters 110(1)-(n) to the mobile devices 104(1)-(n) and the computing devices 106 (1)-(n). As described herein, in some aspects, an ARFT package 108 may be a configurable template for dynamically generating an AR filter 110. Further, each ARFT package 108 may include a script providing composability of two or more ARFT packages 108.

In addition, as illustrated in FIG. 1, the AR filter service 102 may include a management module 112 configured to receive requests 114(1)-(n) for the ARFT packages 108(1)-(n), and transmit responses 116(1)-(n) including the ARFT packages 108(1)-(n). Additionally, the management module 112 may be configured to receive AR submissions 118(1)-(n) including AR filters 110(1)-(n) generated by the mobile devices 104(1)-(n) and/or ARFT packages 108(1)-(n) generated by the computing devices 106(1)-(n). Further, the management module 112 may be configured to transmit the AR filters 110(1)-(n) to the mobile devices 104(1)-(n) and the computing devices 106(1)-(n) to augment a user experience of the users of the mobile devices 104(1)-(n) and the computing devices 106(1)-(n).

As illustrated in FIG. 1, a mobile device 104 may include an AR application 120. The AR application 120 may be configured to apply one or more AR filters 110(1)-(n). For example, the AR application 120 may be a social media application with a video capture feature that permits the application of the AR filters 110(1)-(n) to video captured by the mobile device 104. As another example, the AR application 120 may be a social media application that includes a content upload feature that permits the application of the AR filters 110(1)-(n) to media (e.g., image content or video content) uploaded to or streamed via the social media application. As illustrated in FIG. 1, the AR application 120 may include a package manager 122, an AR development engine 124, a content creation module 126, and one or more sensors 128.

The package manager 122 may be configured to transmit a request 114 for an ARFT package 108 to the AR filter service 102 and receive a response 116 from the AR filter service 102. Upon receipt of an ARFT package 108, the package manager may provide the ARFT package 108 to the AR development engine 124. Further, the package manager 122 may be configured to transmit an AR filter 110 generated by the AR application 120 and/or a configuration file of an AR filter 110 generated by the AR application 120 to the AR filter service 102 via an AR submission 118. In some aspects, providing the AR filter 110 generated by the AR application 120 to the AR filter service 102 allows other mobile devices 104 to acquire and apply the AR filter 110 generated by a mobile device 104.

The AR development engine 124 may be configured to generate AR filters 110 based on one or more ARFT packages 108. In some aspects, the AR development engine 124 may be an application for the development of AR filters 110. Further, the AR development engine 124 may provide at least one of a rendering component, physics engine component, collision detection component, scripting component, sound component, or animation component.

For example, the AR development engine 124 may present a graphical user interface (GUI) configured for simple and intuitive AR filter development, receive user input via the GUI, and generate an AR filter 110 based on the user input via the content creation module 126. In some aspects, the user input may include selection of one or more ARFT packages 108 and user modifications to the one or more ARFT packages 108. Further, in response to the selection of the one or more ARFT packages 108, the package manager 122 may transmit requests 114 for the one or more ARFT packages 108 to the AR filter service 102 and receive responses 116 from the AR filter service 102 including the one or more ARFT packages 108. Upon receipt of the ARFT packages 108, the AR development engine 124 may load the ARFT packages 108 and present one or more GUI components for providing user modifications to the ARFT packages. For example, the AR development engine 124 may prompt a user to provide values for one or more configurable parameters/variables of an ARFT package 108 and/or provide default values for one or more configurable parameters/variables of an ARFT packages 108.

In some aspects, the ARFT package 108 may be development configuration information for implementing a category of AR filters 110 associated with the ARFT package 108. Some examples of AR filter categories include background filters that change or modify the real-world background captured in an image and/or image frame, three-dimensional accessory filters that add virtual objects (e.g., virtual clothes) to a person captured within an image or an image frame, cosmetic filters that add cosmetic objects to a person captured within an image or an image frame, face painting filters that add virtual face paint to the face of a person captured within an image or image frame, overlays, and/or other filters that change or modify a person and/or object.

The development configuration information of an ARFT package 108 may include a filter script that programmatically controls the presentation and/reproduction of the custom perceptive information employed to augment the real-world environment by the category of AR filter 110. As an example, in some aspects, a filter script may configure an AR filter 110 to perform an AR filter feature (e.g., segmentation, face tracking, hand tracking, gesture recognition, and/or animation). In some aspects, segmentation may include at least one of skin segmentation to separate any skin detected by the camera from the rest of an image frame, person segmentation to separate the person using the effect from the person's background, and/or hair segmentation to separate a person's hair from the person's head.

The development configuration information of an ARFT package 108 may further include filter assets information identifying the one or more filter assets present within the custom perceptive information and hierarchical relationships between the one or more filter assets. In some aspects, a "filter asset" may refer to a virtual object and/or device output (e.g., sound, haptic feedback, etc.) presented or reproduced during application of an AR filter 110. In addition, the development configuration information of an ARFT package 108 may include one or more ARFT properties of the custom perceptive information. In some aspects, an ARFT property may refer to an attribute (e.g., size, color, speed, texture, dimension, mask size, transformations, rotations, position, edge softness, etc.) of a filter asset or a value of a parameter/variable of a filter script.

Further, in some aspects, the AR development engine 124 may be configured to combine two or more ARFT packages 108 each corresponding to different AR filter categories. For example, the AR development engine 124 may dynamically generate a customized augmented reality filter (e.g., ARFT filter 110(3)) from a first ARFT package 108(1) and a second ARFT package 108(2). In particular, the ARFT filter 110(1) may be generated from the development configuration information of both the first ARFT package 108(1) and the second ARFT package 108(2). In some aspects, a user may select the first ARFT package 108(1) as the primary ARFT and the second ARFT 108(2) as a secondary ARFT, and the AR development engine 124 may generate an AR filter 110(1) from the primary ARFT 108(1) and the secondary ARFT 108(2). Further, the AR development engine 124 may detect conflicts between the development configuration information of the first ARFT package 108(1) and the development configuration information of the second ARFT package 108(2), and resolve the conflicts (e.g., prioritizing the development configuration information of the primary ARFT or prioritizing the development configuration information identified as being critical to the AR filter categories associated with the primary and the secondary packages). Additionally, or alternatively, in some aspects, a primary ARFT package 108 may include logic (e.g., a script) for incorporating one or more secondary ARFT packages 108.

The content creation module 126 may be configured to generate an AR filter 110 from the customized augmented reality filter of the AR development engine 24 (i.e., the one or more ARFT packages 108 selected by the user via the GUI of the AR development engine 124 and the user modifications to the one or more selected ARFT packages 108). In some aspects, the content creation module 126 may generate a representation of an AR filter 110 as a configuration file executable by the AR application 120. The configuration file may be a JavaScript object notation (JSON) file or an extensible markup language (XML) file.

The one or more sensors 128 may be configured to capture sensor information 130. Some examples of the one or more sensors may include one or more cameras, an accelerometer, a gyroscope, a magnetometer, a global position system unit, one or more biometric sensors, a motion sensor, and/or any other sensor that resides on a mobile device and captures information. Further, the sensor information 130 may be used during the application of an AR filter 110. For example, a camera of the one or more sensors 128 may capture sensor information 130 including a plurality of image frames containing a person, and the AR application 120 may apply an AR filter 110 that applies face paint to the person within the image frames.

A computing device 106 may include a package manager 132 and an AR development engine 134. The package manager 132 may be configured to transmit the requests 114(1)-(n) for an ARFT package 108 to the AR filter service 102 and receive the response 116(1)-(n) from the AR filter service 102. Upon receipt of an ARFT package 108, the package manager may send the ARFT package 108 to the AR development engine 134. Further, the package manager 122 may be configured to transmit an ARFT package 108 or an AR filter 110 generated by the AR application 120 to the AR filter service 102 via an AR submission 118. In some aspects, providing a ARFT package 108 generated by the AR development engine 134 to the AR filter service 102 allows other devices (e.g., the mobile devices 104(1)-(n)) to employ the ARFT 108 to design custom AR filters 110. Additionally, in some aspects, providing the AR filter 110 generated by the AR development engine 134 to the AR filter service 102 allows other devices (e.g., the mobile devices 104(1)-(n)) to acquire and apply the AR filter 110 generated by the computing device 106.

In some aspects, the AR development engine 134 may be configured to generate a ARFT package by selecting one or more pre-existing ARFT packages 108, implementing one or more scripts (e.g., filter scripts, automation scripts, composability scripts, etc.) for an AR filter category, selecting one or more filter features (e.g., segmentation, head tracking, etc.), selecting one or more filter assets, and/or setting one or more ARFT properties.

Figure 2C:
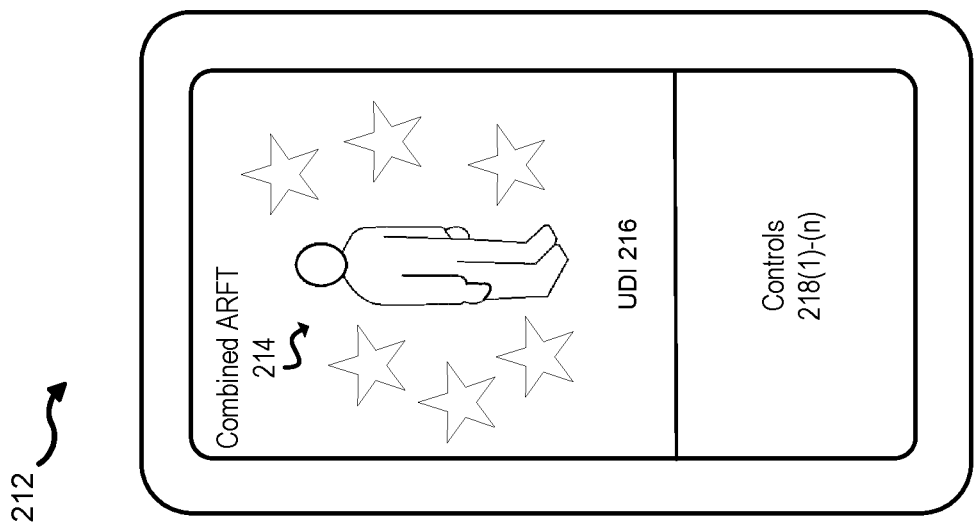
FIG. 2C illustrates an example graphical user interface for providing user modifications to ARFTs, in accordance with some aspects of the present disclosure.
Figure 2B:
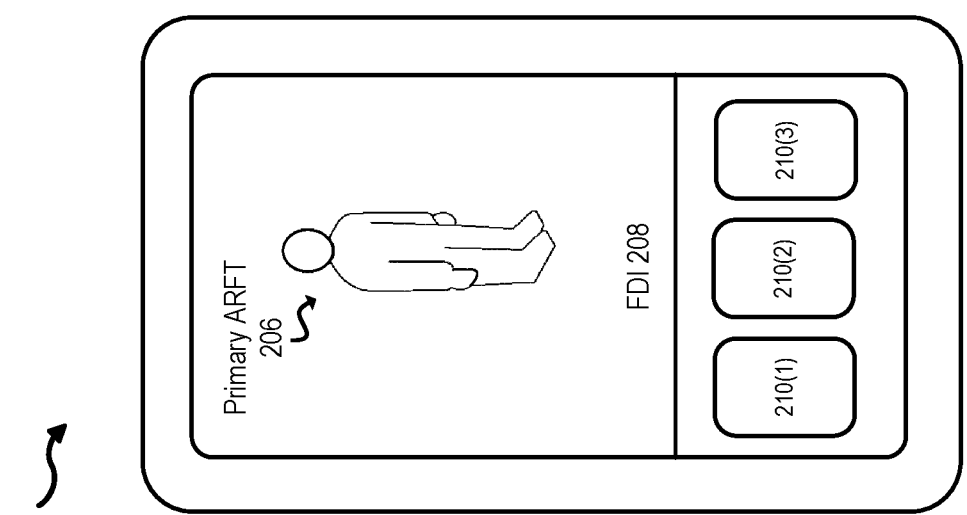
FIG. 2B illustrates an example graphical user interface for selecting a secondary ARFT, in accordance with some aspects of the present disclosure.
Figure 2A:
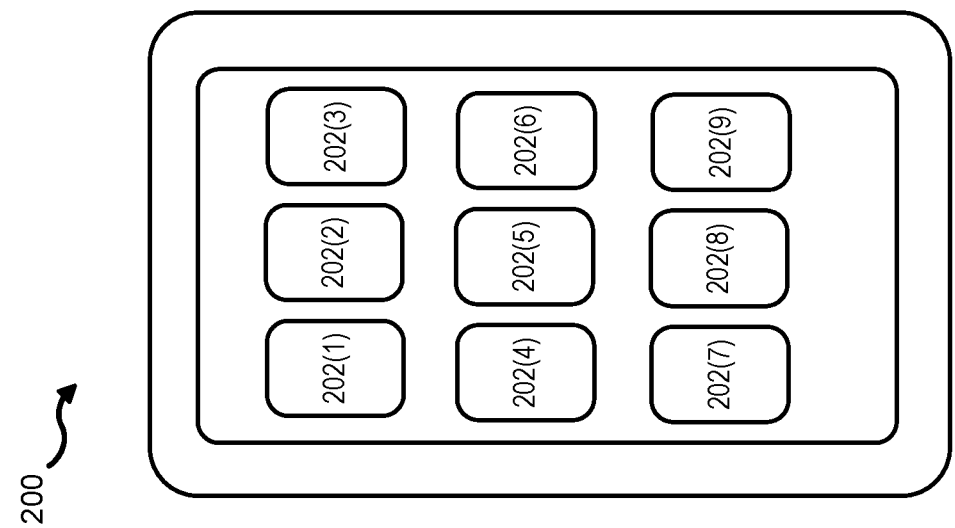
FIG. 2A illustrates an example graphical user interface for selecting a primary ARFT, in accordance with some aspects of the present disclosure.

FIG. 2A illustrates an example graphical user interface for selecting a primary ARFT, in accordance with some aspects of the present disclosure. As illustrated in FIG. 2A, the AR application 120 may present a GUI 200 including a plurality of ARFT category representations 202(1)-(9) for selection by a user. As described in detail herein, selection of an ARFT category representation 202 may cause the AR application 120 to request and receive the corresponding ARFT package 108 via the package manager 122. Further, permitting creation of an AR filter 110 via selection and customization of an ARFT vastly simplifies AR filter generation, thereby permitting resource efficient and user-friendly AR filter generation via a mobile device 104.

FIG. 2B illustrates an example graphical user interface for selecting a secondary ARFT, in accordance with some aspects of the present disclosure. As illustrated in FIG. 2B, the AR application 120 may present a GUI 204. The GUI 204 may present a primary ARFT 206 selected by the user in a first design interface (FDI) 208, and present a plurality of ARFT category representations 210(1)-(3) for selection by the user as a secondary ARFT. Further, permitting the combination of two or more ARFTs 108 via selection of one or more secondary ARFTs and customization of the ARFTs 108 vastly simplifies AR filter generation, thereby permitting resource efficient and user-friendly AR filter generation via a mobile device 104.

FIG. 2C illustrates an example graphical user interface for providing user modifications to ARFTs, in accordance with some aspects of the present disclosure. As illustrated in FIG. 2C, the AR application 120 may present a GUI 212. The GUI 212 may present a combined ARFT 214 selected by the user modification interface (UDI) 216, and present one or more controls 218(1)-(n) (e.g., text input controls, slider controls, control buttons, etc.) for setting ARFT properties of the combined ARFT 214. Further, permitting customization of the combined ARFT 108 vastly simplifies AR filter generation, thereby permitting resource efficient and user-friendly AR filter generation via a mobile device 104.

Example Processes

Figure 3:
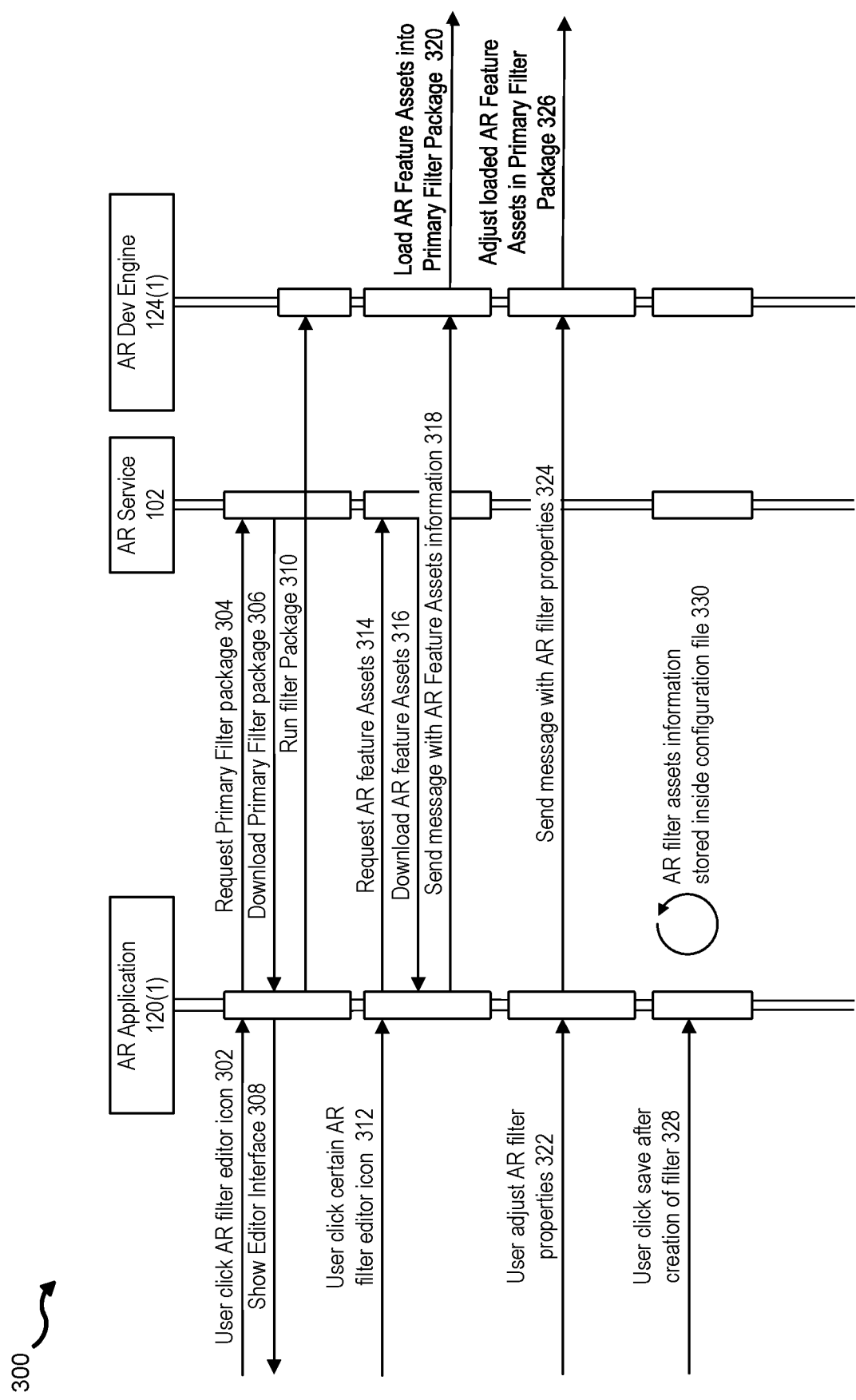
FIG. 3 is a flow diagram illustrating an example method for creating augmented reality filters, in accordance with some aspects of the present disclosure.

FIG. 3 is a flow diagram illustrating an example method for creating augmented reality filters, in accordance with some aspects of the present disclosure.

At step 302, a user may click an AR filter icon. For example, the AR application 120 may receive selection of a graphical representation of an ARFT package 108 within a GUI from the user of a first device 104(2), as described with respect to FIG. 2A. At step 304, the AR application 120 may request a primary filter package in response to the selection of the graphical representation of an ARFT 108. For example, the mobile device 104(1) may transmit a request 114(1) for an ARFT package 108(1) to the AR filter service 102. At step 306, the AR application 120 may download a primary filter package. For example, the mobile device 104(1) may receive a response 116 including the ARFT package 108(1) from the AR filter service 102.

At step 308, the AR application 120 may present a GUI for developing an AR filter. For example, the AR application 120 may present a GUI. At step 310, the AR application 120 may run the primary filter package. For example, the AR development engine 124 may load the AR package 108(1) for generation of an AR filter 110. At step 312, a user may click an AR filter icon. For example, the AR application 120 may receive selection of a graphical representation of an AR package 108(2) via the GUI, as described with respect to FIG. 2B. At step 314, the AR application 120 may request AR feature assets. For example, the AR application 120 may transmit a request 114(2) for the AR package 108(2) to the AR filter service 102. At step 316, the AR application 120 may download the AR feature assets. For example, the AR application 120 may receive the response 116(2) including the AR package 108(2) from the AR filter service 102. At step 318, the AR application 120 may send a message including the AR feature assets to the AR development engine 124. For example, the AR application 120 may provide the AR package 108(2) to the AR development engine 124. At step 320, the AR development engine 124 may load the AR feature assets into the primary filter package. For example, the AR development engine 124 may load the AR package 108(2) for generation of an AR filter 110. As described in detail herein, in some aspects, the AR development engine 124 or the AR package 108(1) may include logic for incorporating the AR package 108(2) into the AR package 108(1).

At step 322, the user may adjust AR filter properties via the GUI of the AR application 120. For example, the user may provide configuration values to the GUI, as described with respect to FIG. 2C. At step 324, the AR application may send a message including the adjusted AR filter properties to the AR development engine 124. For example, the GUI may provide the configuration values to the AR development engine 124. At step 326, the AR development engine 124 may adjust the AR feature assets loaded into the primary filter package. For example, the AR development engine 124 may modify the combination of the AR packages 108(1)-(2) by the configuration values provided by the user via the GUI. At step 328, the user may save the created filter. For example, the AR application 120 may receive a for request generation and storage of a CARF from a user. At step 330, the AR filter assets information is stored in a configuration file 230. For example, the AR development engine 124 may generate and save a configuration file. In some aspects, the configuration file may include identifiers of the ARFT packages 108(1)-(2) and the configuration values provided by the user via the GUI. Further, the AR application 120 may send the configuration file to the AR filter service 102 via an AR submission 118(1) to be utilized by other devices.

Figure 4:
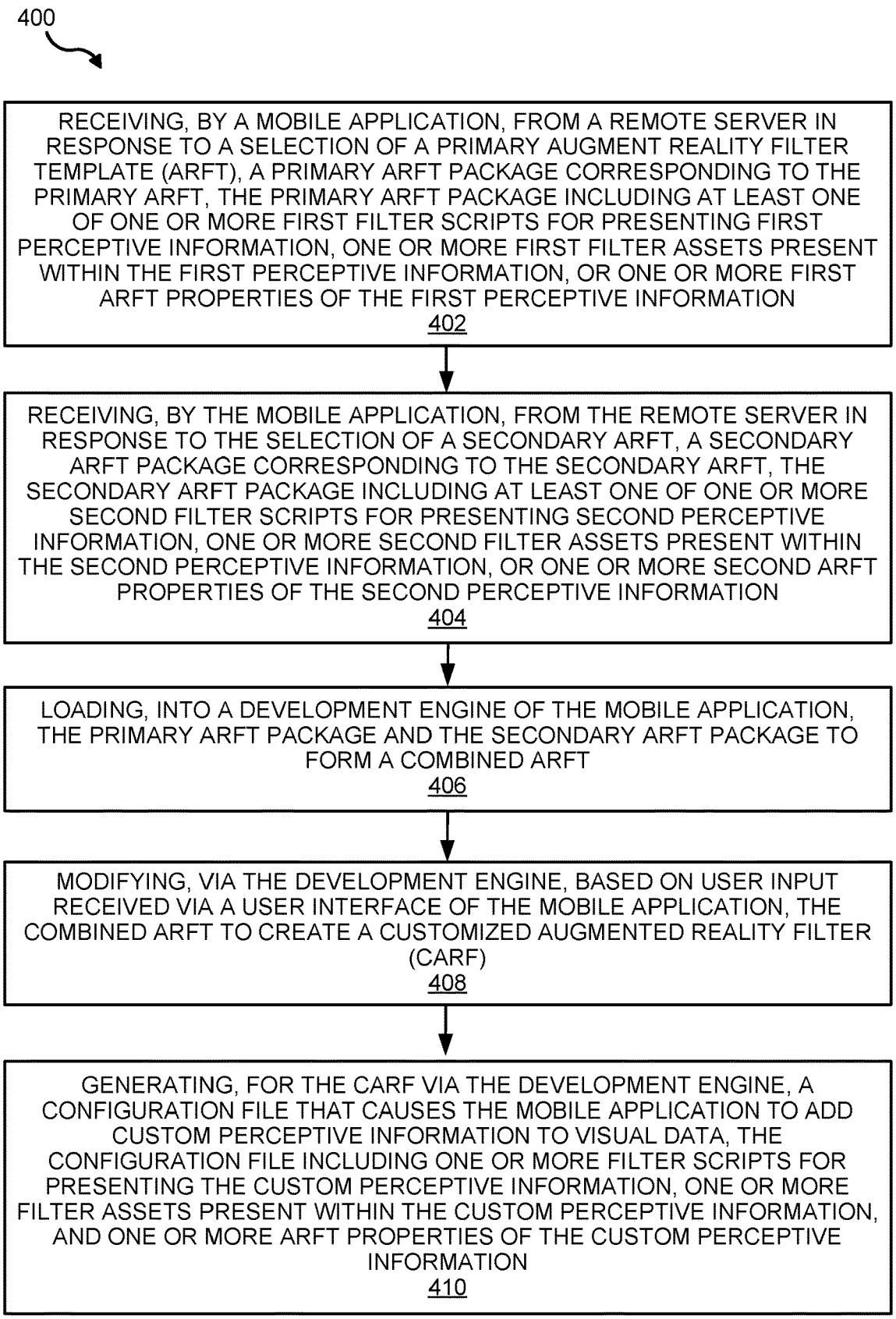
FIG. 4 is a flow diagram illustrating an example method for creating augmented reality filters on mobile devices, in accordance with some aspects of the present disclosure.

FIG. 4 is a flow diagram illustrating an example method for creating augmented reality filters on mobile devices, in accordance with some aspects of the present disclosure.

The process described in FIG. 4 below is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the AR application 120. By way of example and not limitation, the method 400 is described in the context of FIGS. 1-3 and 5. For example, the operations may be performed by one or more of the AR application 120, the package manager 122, the AR development engine 124, and the content creation module 126.

At block 402, the method 400 may include receiving, by a mobile application, from a remote server in response to a selection of a primary augment reality filter template (ARFT), a primary ARFT package corresponding to the primary ARFT, the primary ARFT package including at least one of one or more first filter scripts for presenting first perceptive information, one or more first filter assets present within the first perceptive information, or one or more first ARFT properties of the first perceptive information. For example, the AR application 120(1) and/or the AR development engine 124(1) may present a GUI, and receive selection of a first ARFT package 108(1). As an example, the first ARFT package 108(1) may correspond to a category of AR filters wherein the background of one or more image frames. Further, in response to the selection of the ARFT package 108(1), the package manager 122 may transmit a request 114(1) for the ARFT package 108(1) to the AR filter service 102 and receive a response 116(1) from the AR filter service 102 including the ARFT package 108(1).

Accordingly, the mobile device 104, the computing device 500, and/or the processor 501 executing the package manager 122 may provide means for receiving, by a mobile application, from a remote server in response to a selection of a primary augment reality filter template (ARFT), a primary ARFT package corresponding to the primary ARFT, the primary ARFT package including at least one of one or more first filter scripts for presenting first perceptive information, one or more first filter assets present within the first perceptive information, or one or more first ARFT properties of the first perceptive information.

At block 404, the method 400 may include receiving, by the mobile application, from the remote server in response to the selection of a secondary ARFT, a secondary ARFT package corresponding to the secondary ARFT, the secondary ARFT package including at least one of one or more second filter scripts for presenting second perceptive information, one or more second filter assets present within the second perceptive information, or one or more second ARFT properties of the second perceptive information. For example, the AR application 120(1) and/or the AR development engine 124(1) may present the GUI, and receive selection of a second ARFT package 108(2). As an example, the first ARFT package 108(2) may correspond to a category of AR filters wherein a virtual object is added as an accessory to a person detected within the one or more image frames. Further, in response to the selection of the ARFT package 108(2), the package manager 122 may transmit a request 114(2) for the ARFT package 108(2) to the AR filter service 102 and receive a response 116(2) from the AR filter service 102 including the ARFT package 108(2). As described herein, in some aspects, the ARFT package 108(2) may include at least one of one or more second filter scripts for presenting second perceptive information, one or more second filter assets present within the second perceptive information, or one or more second ARFT properties of the second perceptive information.

Accordingly, the mobile device 104, the computing device 500, and/or the processor 501 executing the package manager 122 may provide means for receiving, by the mobile application, from the remote server in response to the selection of a secondary ARFT, a secondary ARFT package corresponding to the secondary ARFT, the secondary ARFT package including at least one of one or more second filter scripts for presenting second perceptive information, one or more second filter assets present within the second perceptive information, or one or more second ARFT properties of the second perceptive information.

At block 406, the method 400 may include loading, into a development engine of the mobile application, the primary ARFT package and the secondary ARFT package to form a combined ARFT. For example, upon receipt of the ARFT packages 108, the AR application 120 and/or the AR development engine 124 may load the ARFT packages 108(1)-(2) and present one or more GUI components for providing user modifications to the ARFT packages (1)-(2).

Accordingly, the mobile device 104, the computing device 500, and/or the processor 501 executing the AR development engine 124 may provide means for loading, into a development engine of the mobile application, the primary ARFT package and the secondary ARFT package to form a combined ARFT.

At block 408, the method 400 may include modifying, via the development engine, based on user input received via a user interface of the mobile application, the combined ARFT to create a customized augmented reality filter (CARF). For example, the AR development engine 124 may receive user modifications to the ARFT packages 108(1)-(2). As an example, the AR development engine 124 may receive values for one or more configurable parameters/variables of background and virtual object via the GUI.

Accordingly, the mobile device 104, the computing device 500, and/or the processor 501 executing the AR development engine 124 may provide means for modifying, via the development engine, based on user input received via a user interface of the mobile application, the combined ARFT to create a customized augmented reality filter (CARF). As an example, the AR development engine 124 may generate an AR filter 110 that replaces the background and add virtual object added to one or more image frames. The AR filter 110 configured to present perceptual information (i.e., the background and the virtual object) according to the values provided by the user via the GUI.

At block 410, the method 400 may include generating, for the CARF via the development engine, a configuration file that causes the mobile application to add custom perceptive information to visual data, the configuration file including one or more filter scripts for presenting the custom perceptive information, one or more filter assets present within the custom perceptive information, and one or more ARFT properties of the custom perceptive information. For example, the AR development engine 124 may generate a configuration file representing the AR filter 110. In some aspects, the configuration file may include identifiers of the ARFT packages 108(1)-(2) and the configuration values provided by the user via the GUI. Further, AR application 120 may employ the configuration file to reproduce the associated AR filter 110. For example, in some aspects, the AR application 120 may receive the configuration file, download the ARFT packages 108(1)-(2) identified within the configuration file, configure the ARFT packages 108(1)-(2) using the configuration values of the configuration file to generate the AR filter 110(1), and apply the AR filter 110(1) based on the sensor information 130(1). In particular, the AR application 120 may capture image frames using a camera of a mobile device, and display the image frames with perceptive information generated using the AR filter 110(1).

Accordingly, the mobile device 104, the computing device 500, and/or the processor 501 executing the AR development engine 124 and/or the content creation module 126 may provide means for generating, for the CARF via the development engine, a configuration file that causes the mobile application to add custom perceptive information to visual data, the configuration file including one or more filter scripts for presenting the custom perceptive information, one or more filter assets present within the custom perceptive information, and one or more ARFT properties of the custom perceptive information.

Additionally, or alternatively, the method 400 may include capturing sensor data via one or more sensors of a mobile device and presenting, based on the configuration file and the sensor data, via a display interface of the mobile device, video data including the custom perceptive information.

Additionally, or alternatively, the selection of the primary ARFT comprises receiving selection of an ARFT category of plurality of ARFT categories.

Additionally, or alternatively, the plurality of ARFT categories include at least one of background filters, three-dimensional accessories, cosmetic filters, face painting, and/or an image frame attribute filters.

Additionally, or alternatively, modifying the combined ARFT, comprises modifying, via a graphical user interface of the mobile application, a filter script of the one or more filter scripts for presenting the custom perceptive information, a filter asset of the one or more filter assets present within the custom perceptive information, or a property of the one or more ARFT properties of the custom perceptive information.

Additionally, or alternatively, the one or more filter assets present within the custom perceptive information of the CARF include an animated object, a material, and/or a mesh.

Additionally, or alternatively, the method 400 may include transmitting the configuration file to the remote server, the remote server configured to transmit the configuration file to other mobile devices configured to implement the CARF with respect to locally captured sensor information.

Additionally, or alternatively, loading the primary ARFT package and the secondary ARFT package to form a combined ARFT comprises incorporating, via a script, the secondary ARFT package into the primary ARFT.

While the operations are described as being implemented by one or more computing devices, in other examples various systems of computing devices may be employed. For instance, a system of multiple devices may be used to perform any of the operations noted above in conjunction with each other.

Illustrative Computing Device

Figure 5:
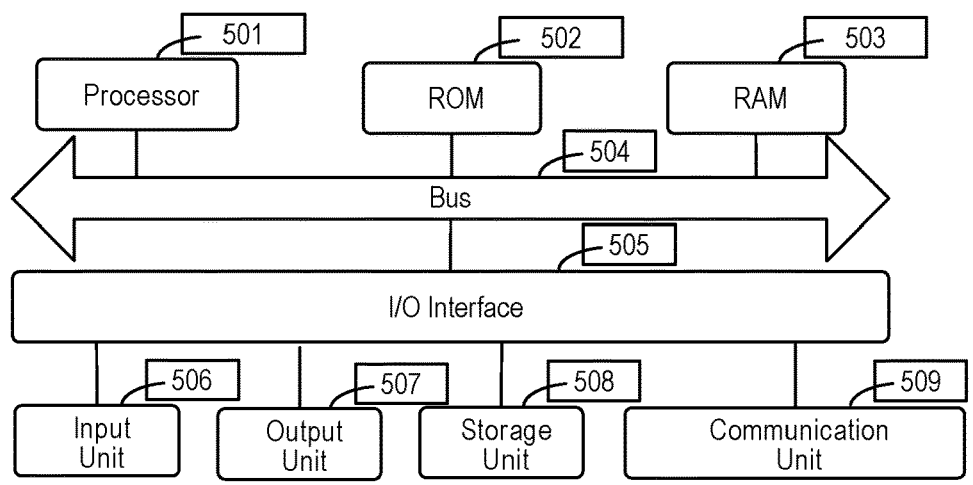
FIG. 5 is a block diagram illustrating an example of a hardware implementation for a computing device(s), in accordance with some aspects of the present disclosure.

FIG. 5 illustrates a block diagram of an example computing system/device 500 (e.g., the AR filter service 102, the mobile device 104, the computing device 106) suitable for implementing example embodiments of the present disclosure. The system/device 500 may be a general-purpose computer, a physical computing device, or a portable electronic device, or may be practiced in distributed cloud computing environments where tasks are performed by remote processing devices that are linked through a communication network. The system/device 500 can be used to implement any of the processes described herein.

As depicted, the system/device 500 includes a processor 501 which is capable of performing various processes according to a program stored in a read only memory (ROM) 502 or a program loaded from a storage unit 508 to a random-access memory (RAM) 503. In the RAM 503, data required when the processor 501 performs the various processes or the like is also stored as required. The processor 501, the ROM 502 and the RAM 503 are connected to one another via a bus 504. An input/output (I/O) interface 505 is also connected to the bus 504.

The processor 501 may be of any type suitable to the local technical network and may include one or more of the following: general purpose computers, special purpose computers, microprocessors, digital signal processors (DSPs), graphic processing unit (GPU), co-processors, and processors based on multicore processor architecture, as non-limiting examples. The system/device 500 may have multiple processors, such as an application-specific integrated circuit chip that is slaved in time to a clock which synchronizes the main processor.

A plurality of components in the system/device 500 are connected to the I/O interface 505 (e.g., the one or more sensors 128), including an input unit 506, such as a keyboard, a mouse, microphone) or the like; an output unit 507 including a display such as a cathode ray tube (CRT), a liquid crystal display (LCD), or the like, and a speaker or the like; the storage unit 508, such as disk and optical disk, and the like; and a communication unit 509, such as a network card, a modem, a wireless transceiver, or the like. The communication unit 509 allows the system/device 500 to exchange information/data with other devices via a communication network, such as the Internet, various telecommunication networks, and/or the like.

The methods and processes described above, such as the method 400, can also be performed by the processor 501. In some embodiments, the method 400 can be implemented as a computer software program or a computer program product tangibly included in the computer readable medium, e.g., storage unit 508. In some embodiments, the computer program can be partially or fully loaded and/or embodied to the system/device 500 via ROM 502 and/or communication unit 509. The computer program includes computer executable instructions that are executed by the associated processor 501. When the computer program is loaded to RAM 503 and executed by the processor 501, one or more acts of the method 400 described above can be implemented. Alternatively, processor 501 can be configured via any other suitable manners (e.g., by means of firmware) to execute the method 400 in other embodiments.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A method comprising:
   receiving, by a mobile application, from a remote server in response to a selection of a primary augment reality filter template (ARFT) from a plurality of ARFT representations in a first graphical user interface (GUI), a primary ARFT package corresponding to the primary ARFT, the primary ARFT package including at least one of one or more first filter scripts for presenting first perceptive information, one or more first filter assets present within the first perceptive information, or one or more first ARFT properties of the first perceptive information;
   receiving, by the mobile application, from the remote server in response to a selection of a secondary ARFT from a plurality of secondary ARFT representations in a second GUI, a secondary ARFT package corresponding to the secondary ARFT, the secondary ARFT package including at least one of one or more second filter scripts for presenting second perceptive information, one or more second filter assets present within the second perceptive information, or one or more second ARFT properties of the second perceptive information, wherein a first portion of the second GUI displays the primary ARFT and wherein a second portion of the second GUI displays the plurality of secondary ARFT representations;
   loading, into a development engine of the mobile application, the primary ARFT package and the secondary ARFT package to form a combined ARFT;
   modifying, via the development engine, based on user input received via a third GUI, the combined ARFT to create a customized augmented reality filter (CARF), wherein a first portion of the third GUI displays the combined ARFT and wherein a second portion of the third GUI displays customization controls for the combined ARFT; and
   generating, for the CARF via the development engine, a configuration file that causes the mobile application to add custom perceptive information to visual data, the configuration file including one or more filter scripts for presenting the custom perceptive information, one or more filter assets present within the custom perceptive information, and one or more ARFT properties of the custom perceptive information.

2. The method of claim 1, further comprising:
capturing sensor data via one or more sensors of a mobile device; and
presenting, based on the configuration file and the sensor data, via a display interface of the mobile device, video data including the custom perceptive information.

3. The method of claim 1, wherein the selection of the primary ARFT comprises receiving a selection of an ARFT category of plurality of ARFT categories.

4. The method of claim 3, wherein the plurality of ARFT categories include at least one of background filters, three-dimensional accessories, cosmetic filters, face painting, and/or an image frame attribute filters.

5. The method of claim 1, wherein modifying the combined ARFT, comprises:
modifying a filter script of the one or more filter scripts for presenting the custom perceptive information, a filter asset of the one or more filter assets present within the custom perceptive information, or a property of the one or more ARFT properties of the custom perceptive information.

6. The method of claim 1, wherein the one or more filter assets present within the custom perceptive information of the CARF include an animated object, a material, and/or a mesh.

7. The method of claim 1, further comprising transmitting the configuration file to the remote server, the remote server configured to transmit the configuration file to other mobile devices configured to implement the CARF with respect to locally captured sensor information.

8. The method of claim 1, wherein loading the primary ARFT package and the secondary ARFT package to form the combined ARFT comprises incorporating, via a script, the secondary ARFT package into the primary ARFT.

9. A non-transitory computer-readable device having instructions thereon that, when executed by at least one computing device, causes the at least one computing device to perform operations comprising:
receiving, by a mobile application, from a remote server in response to a selection of a primary augment reality filter template (ARFT) from a plurality of ARFT representations in a first graphical user interface (GUI), a primary ARFT package corresponding to the primary ARFT, the primary ARFT package including at least one of one or more first filter scripts for presenting first perceptive information, one or more first filter assets present within the first perceptive information, or one or more first ARFT properties of the first perceptive information;
receiving, by the mobile application, from the remote server in response to the selection of a secondary ARFT from a plurality of secondary ARFT representations in a second GUI, a secondary ARFT package corresponding to the secondary ARFT, the secondary ARFT package including at least one of one or more second filter scripts for presenting second perceptive information, one or more second filter assets present within the second perceptive information, or one or more second ARFT properties of the second perceptive information, wherein a first portion of the second GUI displays the primary ARFT and wherein a second portion of the second GUI displays the plurality of secondary ARFT representations;
loading, into a development engine of the mobile application, the primary ARFT package and the secondary ARFT package to form a combined ARFT;
modifying, via the development engine, based on user input received via a third GUI, the combined ARFT to create a customized augmented reality filter (CARF), wherein a first portion of the third GUI displays the combined ARFT and wherein a second portion of the third GUI displays customization controls for the combined ARFT; and
generating, for the CARF via the development engine, a configuration file that causes the mobile application to add custom perceptive information to visual data, the configuration file including one or more filter scripts for presenting the custom perceptive information, one or more filter assets present within the custom perceptive information, and one or more ARFT properties of the custom perceptive information.

10. The non-transitory computer-readable device of claim 9, wherein the instructions cause the at least one computing device to perform operations further comprising:
capturing sensor data via one or more sensors of a mobile device; and
presenting, based on the configuration file and the sensor data, via a display interface of the mobile device, video data including the custom perceptive information.

11. The non-transitory computer-readable device of claim 9, wherein the selection of the primary ARFT comprises receiving a selection of an ARFT category of plurality of ARFT categories.

12. The non-transitory computer-readable device of claim 11, wherein the plurality of ARFT categories include at least one of background filters, three-dimensional accessories, cosmetic filters, face painting, and/or an image frame attribute filters.

13. The non-transitory computer-readable device of claim 9, wherein modifying the combined ARFT, comprises:
modifying a filter script of the one or more filter scripts for presenting the custom perceptive information, a filter asset of the one or more filter assets present within the custom perceptive information, or a property of the one or more ARFT properties of the custom perceptive information.

14. The non-transitory computer-readable device of claim 9, wherein the one or more filter assets present within the custom perceptive information of the CARF include an animated object, a material, a mesh.

15. The non-transitory computer-readable device of claim 9, wherein the instructions cause the at least one computing device to perform operations further comprising transmitting the configuration file to the remote server, the remote server configured to transmit the configuration file to other mobile devices configured to implement the CARF with respect to locally captured sensor information.

16. The non-transitory computer-readable device of claim 9, wherein loading the primary ARFT package and the secondary ARFT package to form the combined ARFT comprises incorporating, via a script, the secondary ARFT package into the primary ARFT.

17. A system comprising:
a memory storing instructions thereon; and
at least one processor coupled with the memory and configured by the instructions to:

receive, by a mobile application, from a remote server in response to a selection of a primary augment reality filter template (ARFT) from a plurality of ARFT representations in a first graphical user interface (GUI), a primary ARFT package corresponding to the primary ARFT, the primary ARFT package including at least one of one or more first filter scripts for presenting first perceptive information, one or more first filter assets present within the first perceptive information, or one or more first ARFT properties of the first perceptive information;

receive, by the mobile application, from the remote server in response to the selection of a secondary ARFT from a plurality of secondary ARFT representations in a second GUI, a secondary ARFT package corresponding to the secondary ARFT, the secondary ARFT package including at least one of one or more second filter scripts for presenting second perceptive information, one or more second filter assets present within the second perceptive information, or one or more second ARFT properties of the second perceptive information, wherein a first portion of the second GUI displays the primary ARFT and wherein a second portion of the second GUI displays the plurality of secondary ARFT representations;

load, into a development engine of the mobile application, the primary ARFT package and the secondary ARFT package to form a combined ARFT;

modify, via the development engine, based on user input received via a third GUI, the combined ARFT to create a customized augmented reality filter (CARF), wherein a first portion of the third GUI displays the combined ARFT and wherein a second portion of the third GUI displays customization controls for the combined ARFT; and generate, for the CARF via the development engine, a configuration file that causes the mobile application to add custom perceptive information to visual data, the configuration file including one or more filter scripts for presenting the custom perceptive information, one or more filter assets present within the custom perceptive information, and one or more ARFT properties of the custom perceptive information.

18. The system of claim 17, wherein the at least one processor is further configured by the instructions to:

capture sensor data via one or more sensors of a mobile device; and present, based on the configuration file and the sensor data, via a display interface of the mobile device, video data including the custom perceptive information.

19. The system of claim 17, wherein to receive the selection of the primary ARFT, the at least one processor is further configured by the instructions to receive selection of an ARFT category of plurality of ARFT categories.

20. The system of claim 17, wherein to load the primary ARFT package and the secondary ARFT package to form the combined ARFT, the at least one processor is further configured by the instructions to incorporate, via a script, the secondary ARFT package into the primary ARFT.

* * * * *